United States Patent
Yamaoka et al.

(10) Patent No.: US 11,087,440 B2
(45) Date of Patent: Aug. 10, 2021

(54) COLLATION DEVICE AND COLLATION METHOD

(71) Applicant: PANASONIC INTELLECTUAL PROPERTY MANAGEMENT CO., LTD., Osaka (JP)

(72) Inventors: Megumi Yamaoka, Tokyo (JP); Takayuki Matsukawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 15 days.

(21) Appl. No.: 16/623,622

(22) PCT Filed: May 30, 2018

(86) PCT No.: PCT/JP2018/020686
§ 371 (c)(1),
(2) Date: Dec. 17, 2019

(87) PCT Pub. No.: WO2019/017079
PCT Pub. Date: Jan. 24, 2019

(65) Prior Publication Data
US 2020/0193567 A1   Jun. 18, 2020

(30) Foreign Application Priority Data
Jul. 19, 2017   (JP) .............................. JP2017-139664

(51) Int. Cl.
*G06T 5/00*   (2006.01)
*G06K 9/00*   (2006.01)

(52) U.S. Cl.
CPC .......... *G06T 5/002* (2013.01); *G06K 9/00221* (2013.01); *G06T 2207/30201* (2013.01)

(58) Field of Classification Search
CPC . G06T 5/002; G06T 2207/30201; G06T 7/00; G06K 9/00221; G06K 9/44;
(Continued)

(56) References Cited

U.S. PATENT DOCUMENTS

| | | | |
|---|---|---|---|
| 2012/0087552 A1* | 4/2012 | Lee ................... | G06K 9/00275 382/118 |
| 2014/0169643 A1* | 6/2014 | Todoroki ........... | G06K 9/00248 382/118 |
| 2019/0042895 A1* | 2/2019 | Liang ................. | G06K 9/00288 |

FOREIGN PATENT DOCUMENTS

| | | |
|---|---|---|
| JP | 11-339048 | 12/1999 |
| JP | 2007-280367 | 10/2007 |
| JP | 2009-157766 | 7/2009 |

OTHER PUBLICATIONS

International Search Report issued in International Pat. Appl. No. PCT/JP2018/020686, dated Aug. 14, 2018.

\* cited by examiner

Primary Examiner — Phuoc Tran
(74) Attorney, Agent, or Firm — Greenblum & Bernstein, P.L.C.

(57) ABSTRACT

Collation device is configured to include a processor, and a storage unit that stores a blurring amount which is set in advance for collation in association with the registered image in advance, in which the processor blurs a face image obtained by imaging an authenticated person with imaging unit with a blurring amount for collation in association with a registered image corresponding to the face image, and uses the image blurred with the blurring amount for collation to perform face authentication. The blurring amount for collation is set such that, a real image blurred by the blurring amount can be authenticated but a photographic image blurred by the blurring amount cannot be authenticated, the (Continued)

real image being a face image obtained by imaging a real face of an authenticated person and the photographic image being a face image obtained by imaging a face photograph of the authenticated person.

7 Claims, 6 Drawing Sheets

(58) Field of Classification Search
CPC .. G06K 9/00275; G06K 9/00288; G06K 9/56; G06K 9/00899
See application file for complete search history.

COLLATION DEVICE AND COLLATION METHOD

TECHNICAL FIELD

The present disclosure relates to a collation device and a collation method of collating a captured image obtained by imaging a subject with an imaging device with a registered image of a registered subject registered in advance.

BACKGROUND ART

In the related art, a face authentication technique for identifying an individual based on a face image is known. In such a face authentication technique, face authentication is performed by collating a face image obtained by imaging the face of the authenticated person with the imaging device with a face image of the authenticated person registered in advance. For example, in a mobile terminal such as a smartphone, in a case of performing face authentication for collating identification of a user of the terminal, the face authentication is performed by collating a face image obtained by imaging a face of an authenticated person with an imaging device (camera) mounted on the mobile terminal with a registered image (a face image of the authenticated person obtained by imaging in advance) registered in advance in the mobile terminal or an authentication server that can communicate with the mobile terminal.

However, such a face authentication technique has a problem of "impersonation" that uses a face photograph to impersonate a person of the face photograph and fraudulently acquire authentication. For example, it is assumed that a person who obtains a mobile terminal and a user ID of the terminal tries to obtain authentication fraudulently by using a face image obtained by imaging a face photograph attached to the ID with an imaging device to impersonate a person in the face photograph. For this reason, it is required to identify whether a face image obtained by imaging with an imaging device is obtained by imaging a photograph or a person.

In this regard, a method of requesting a predetermined operation such as blinking or changing the orientation of a face to an authenticated person at the time of imaging, and checking an imaging subject is a person based on whether or not the requested operation is performed, and a method checking that an imaging subject is a person by changing lighting conditions and imaging a plurality of times, and comparing shadows generated in the face images obtained by every single image have been proposed (refer to PTL 1).

CITATION LIST

Patent Literature

PTL 1: Japanese Patent Unexamined Publication No. 11-339048

SUMMARY OF THE INVENTION

However, in the method disclosed in the above PTL 1, there is a problem in that it is necessary to request a predetermined operation for the authenticated person at the time of imaging, or to change the lighting conditions to image a plurality of times, and thereby convenience and simplicity of the face authentication work are impaired.

The present disclosure has been devised in view of such a problem of the technique in the related art, and a main object of the present disclosure is to provide a collation device and a collation method according to the present disclosure that can easily prevent fraud using a photograph in a technique for collating a captured image obtained by imaging a subject with an imaging device with a registered image of a registered subject registered in advance.

According to the present disclosure, there is provided a collation device that collates a captured image obtained by imaging a subject by using an imaging device with a registered image of a registered subject which is registered in advance, the device including a processor, and a storage unit that stores a blurring amount which is set in advance for collation in association with the registered image in advance, in which the processor blurs the captured image with the blurring amount for collation associated with the registered image corresponding to the captured image, and collates whether or not the subject in an image blurred with the blurring amount for collation matches the registered subject in the registered image by using the image.

According to the present disclosure, it possible to easily prevent fraud using a photograph in a collation technique for collating a captured image obtained by imaging a subject with an imaging device with a registered image of a registered subject registered in advance.

BRIEF DESCRIPTION OF DRAWINGS

FIG. 6(a) is a diagram before designating the blurring amount, and FIG. 6(b) is a diagram after designating the blurring amount.

DESCRIPTION OF EMBODIMENTS

Figure 1:
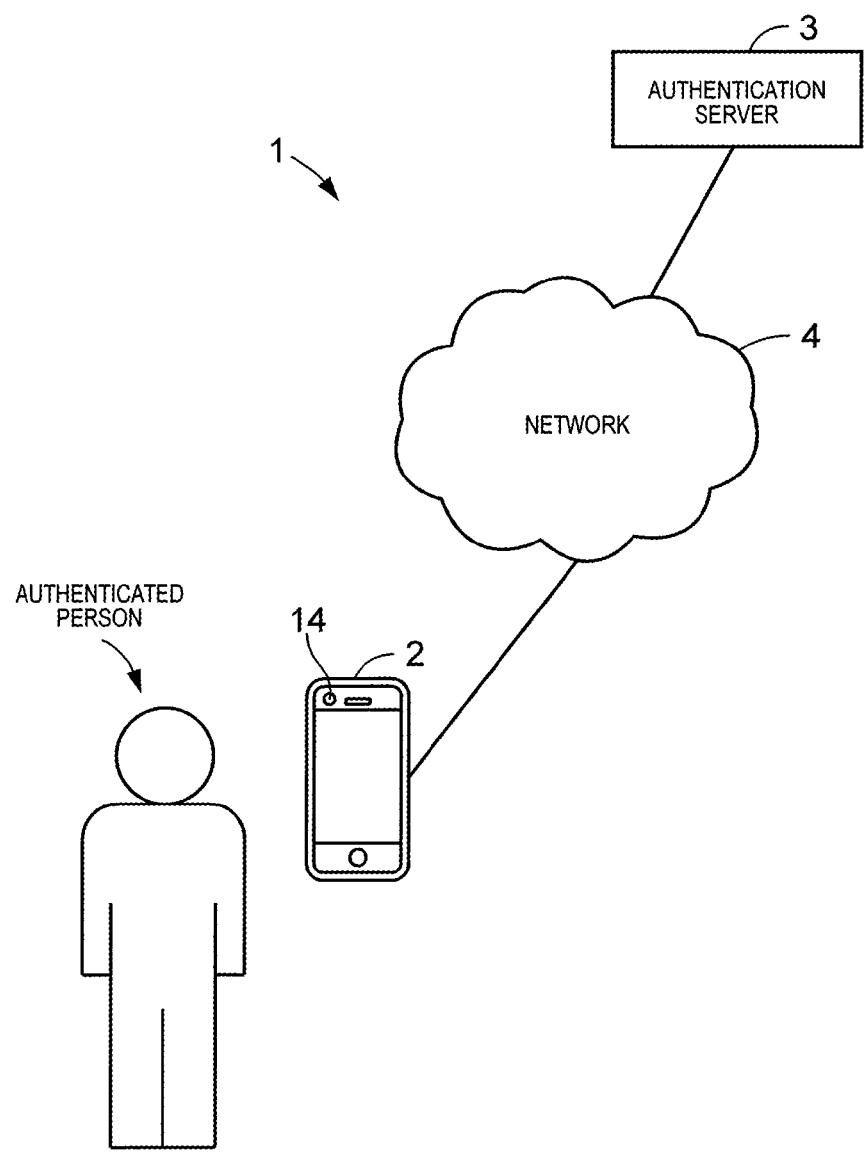
FIG. 1 is a schematic diagram of a collation system including a collation device according to the present disclosure.

A first disclosure made to solve the above problems relates to a collation device that collates a captured image obtained by imaging a subject by using an imaging device with a registered image of a registered subject which is registered in advance, the device including a processor, and a storage unit that stores a blurring amount which is set in advance for collation in association with the registered image in advance, in which the processor blurs the captured image with the blurring amount for collation associated with the registered image corresponding to the captured image, and collates whether or not the subject in an image blurred with the blurring amount for collation matches the registered subject in the registered image by using the image.

According to the collation device according to the first disclosure, when the collation is performed, a photographic image can be eliminated by blurring a captured image obtained by imaging the subject with the imaging device with the blurring amount for collation. This makes it possible to easily prevent fraud using photographs.

In a second disclosure according to the above first disclosure, the blurring amount for collation is set such that, a real image blurred by the blurring amount is capable of being collated but a photographic image blurred by the blurring amount is not capable of being collated, the real image being an image obtained by imaging a real subject and the photographic image being an image obtained by imaging a photograph of the subject.

According to the collation device of the second disclosure, when performing the collation, it is possible to distinguish the real image and the photographic image from each other. With this, the photographic image is easily removed.

In a third disclosure according to the above second disclosure, the blurring amount for collation is obtained by repeating the collation after blurring the real image and the photographic image with a predetermined blurring amount.

According to the collation device of the third disclosure, an appropriate blurring amount for collation can be easily obtained by trial and error.

In a fourth disclosure according to the above second disclosure, the blurring amount for collation is obtained by repeating the collation after blurring the real image and the photographic image with a blurring amount designated by a user.

According to the collation device of the fourth disclosure, the user can sensuously set an appropriate blurring amount for collation.

In a fifth disclosure according to any one of the first disclosure to the fourth disclosure, the captured image is blurred by applying a smoothing filter, and the blurring amount for collation is set as the number of times the smoothing filter is applied or as a parameter of the smoothing filter.

According to the collation device of the fifth disclosure, it is possible to quantitatively perform a process of blurring the captured image and a setting of the blurring amount for collation. Therefore, it is possible to reliably reproduce the blurring amount for collation in the process of blurring the captured image at the time of collation.

In a sixth disclosure according to any one of the first disclosure to the fifth disclosure, the processor controls the imaging device so that imaging of the subject when performing the collation is performed using a focal distance used when the blurring amount for collation is set.

According to the collation device of the sixth disclosure, it is possible to prevent an error from occurring in the blurring amount due to the difference in the focal distance between when the collation is performed and when the blurring amount for collation is set. Therefore, accuracy of the collation can be improved.

Further, a seventh disclosure according to any one of the first disclosure to the sixth disclosure, the subject is a person's face.

According to the collation device of the seventh disclosure, it is possible to collate a person's face. Therefore, it is possible to prevent impersonation using a face photograph attached to an identification card or the like.

An eighth disclosure relates to a collation method of collating a captured image obtained by imaging a subject by using an imaging device with a registered image of a registered subject which is registered in advance, the method including a step of storing a blurring amount which is set in advance for collation in association with the registered image in advance, a step of blurring the captured image with the blurring amount for collation associated with the registered image corresponding to the captured image, and a step of collating whether or not the subject in an image blurred with the blurring amount for collation matches the registered subject in the registered image by using the image.

According to the collation method according to the eighth disclosure, when the collation is performed, a photographic image can be eliminated by blurring a captured image obtained by imaging the subject with the imaging device with the blurring amount for collation. This makes it possible to easily prevent fraud using photographs.

Hereinafter, embodiments of the present disclosure will be described with reference to the drawings. A situation, in which face authentication is performed by collating a face image obtained by imaging a face of the authenticated person with a registered image registered in advance (face of the authenticated person image obtained by imaging in advance), is explained in the following embodiments.

FIG. 1 is a schematic diagram of collation system 1 including a collation device according to the present disclosure. As illustrated in FIG. 1, collation system 1 includes mobile terminal 2 possessed by an authenticated person who needs face authentication, and authentication server 3 that performs face authentication in cooperation with mobile terminal 2. Mobile terminal 2 corresponds to the collation device according to the present disclosure. Mobile terminal 2 and authentication server 3 are connected to each other via network 4 such as the Internet or a dedicated line.

Mobile terminal 2 is, for example, a smartphone or a tablet terminal, and includes imaging unit 14 for imaging the face of the authenticated person. Mobile terminal 2 is installed with an authentication request application program for requesting face authentication based on a face image obtained by imaging with imaging unit 14 (hereinafter, referred to as "captured image"). When performing the face authentication, the authentication request application program is activated, and the authenticated person performs an operation for requesting face authentication, and when the face of the authenticated person is imaged by imaging unit 14, an authentication request and a captured image are transmitted to authentication server 3 from mobile terminal 2, and a process related to the face authentication is executed in authentication server 3.

Authentication server 3 is a general computer device, and stores the face image (hereinafter, referred to as "registered image") of the authenticated person obtained by imaging in advance. When authentication server 3 receives the authentication request and the captured image from mobile terminal 2, authentication server 3 performs the face authentication by collating the received captured image with a registered image. This collation may be performed using a known collation method in the related art based on feature points such as each part of the face (for example, eyes, nose, and mouth) and contour. In addition, the collation result (that is, authentication result) is transmitted to mobile terminal 2, and the face authentication based on a captured image is completed by this.

Figure 2:
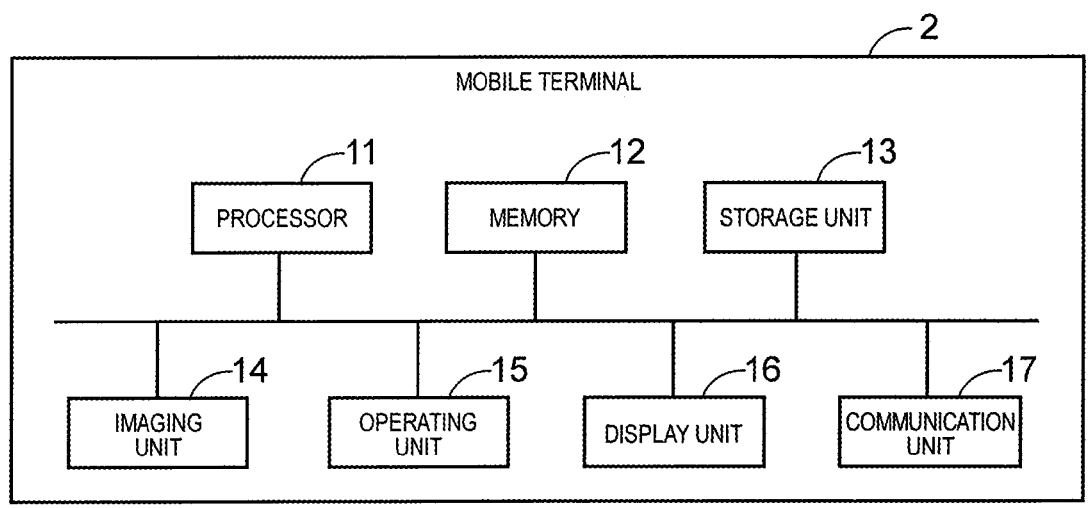
FIG. 2 is a block diagram illustrating a schematic configuration of a mobile terminal.

FIG. 2 is a block diagram illustrating a schematic configuration of mobile terminal 2. Mobile terminal 2 has a known hardware configuration, and includes processor 11 that centrally executes each process (for example, an authentication request process) of mobile terminal 2 based on a predetermined control program (for example, an authentication request program), memory 12 that is, for example, a random access memory (RAM) and functions as a work area of processor 11, and storage unit 13 that is, for example, a storage (storage device) such as a read only memory (ROM) or a hard disk, and stores a control program executed by processor 11, a blurring amount database (DB), and the like.

The blurring amount DB stores a blurring amount for collation which will be described below.

Mobile terminal 2 further includes imaging unit 14 that images a face of the authenticated person and generates a face image (captured image), operating unit 15 in which an operation for obtaining face authentication and an operation for causing imaging unit 14 to perform imaging are performed by the authenticated person, display unit 16 for displaying a captured image, a screen of an authentication result, and the like, and communication unit 17 that further executes communication via network 4. Imaging unit 14 is a solid-state imaging device such as a CMOS image sensor, and has a fixed focal distance.

Figure 3:
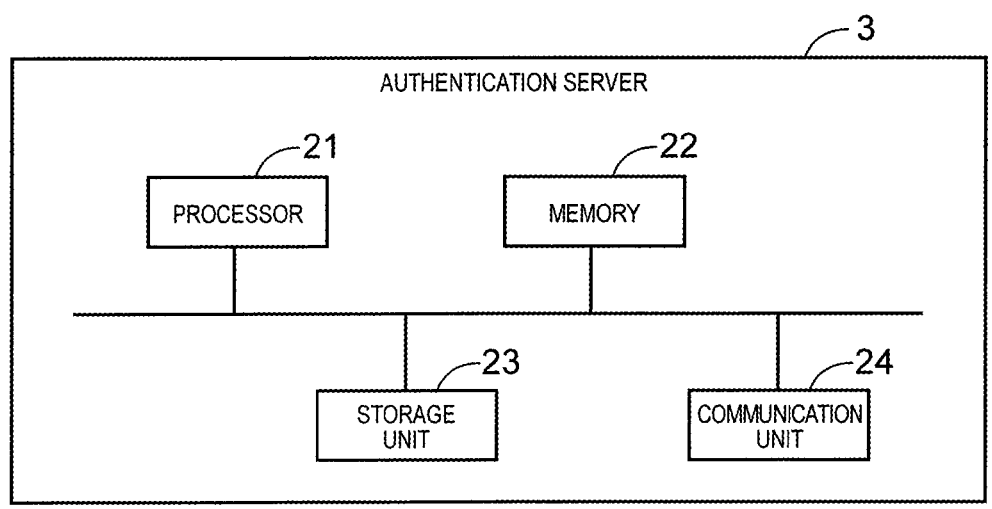
FIG. 3 is a block diagram illustrating a schematic configuration of an authentication server.

FIG. 3 is a block diagram illustrating a schematic configuration of authentication server 3. Authentication server 3 has a known hardware configuration, and includes processor 21 that centrally executes each process (for example, a face authentication process) of authentication server 3 based on a predetermined control program (for example, face authentication program), memory 22 that is, for example, a RAM and functions as a work area of processor 21, and storage unit 23 that is, for example, a storage such as a ROM or a hard disk, and stores a control program executed by processor 21, a registered image used for face authentication, and the like, communication unit 24 that performs communication via network 4.

Next, the blurring amount for collation stored in the blurring amount DB (hereinafter, simply referred to as "blurring amount") and a method of obtaining the blurring amount will be described. Hereinafter, an image obtained by imaging a face photograph (printed face photograph) of the authenticated person is referred to as a "photographic image", and an image obtained by imaging the real face of the authenticated person is referred to as a "real image". In the present embodiment, a photograph of a driver's license is used as the face photograph of the authenticated person. The face photograph of the authenticated person is not limited to a photograph of a driver's license, but can be a face photograph attached to a passport, a basic resident registration card, a student card, and other various identification cards.

Figure 4:
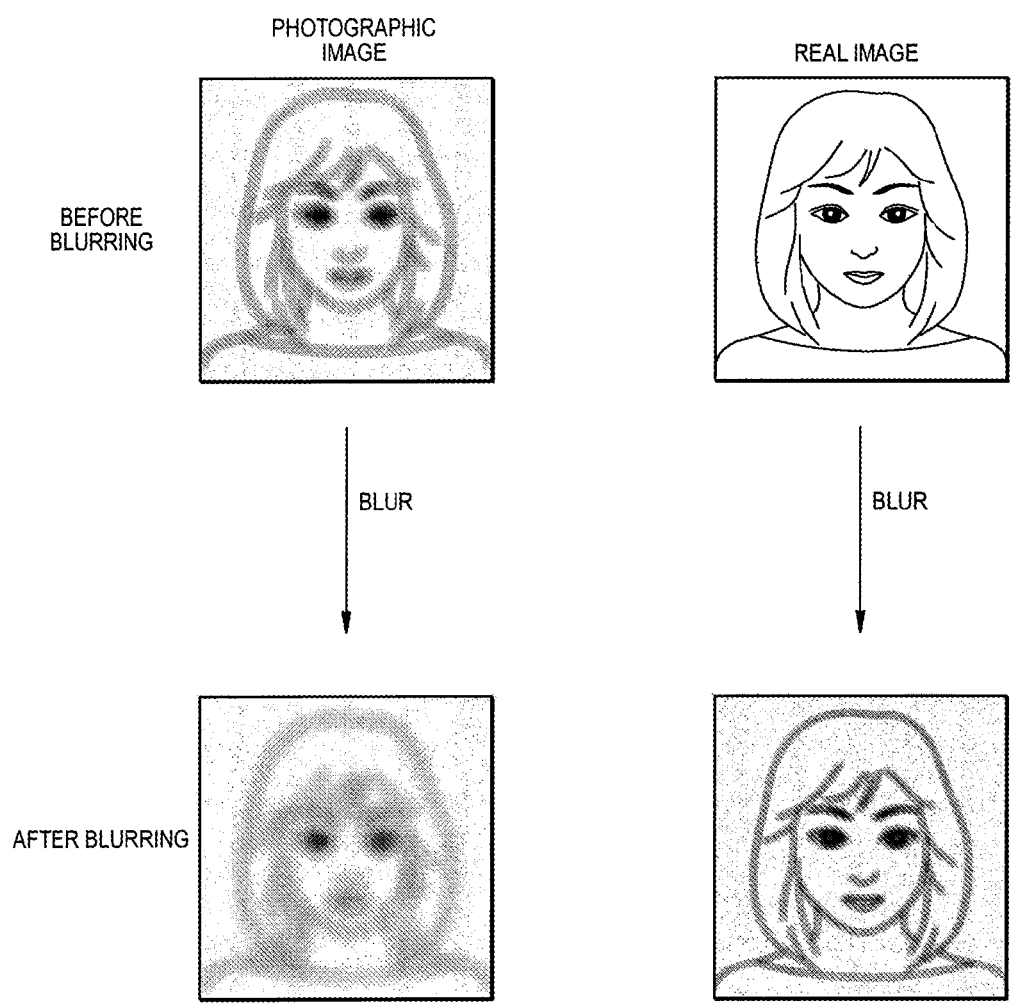
FIG. 4 is a diagram illustrating a photographic image and a real image and images obtained by blurring each image.

FIG. 4 is a diagram illustrating a photographic image and a real image and images obtained by blurring each image. As illustrated in FIG. 4, the photographic image tends to be blurred inherently. Since imaging unit 14 (camera) of mobile terminal 2 has a fixed focal distance, when imaging a face photograph with imaging unit 14, imaging unit 14 is imaged close to the face photograph. For this reason, the face photograph that is the subject cannot be focused, and the photographic image is blurred.

Therefore, if a blurring amount that makes the authentication possible when blurring the real image and makes authentication impossible when blurring the photographic image is obtained in advance through trial and error or experimentation, when performing the face authentication, it is possible to distinguish the real image and the photographic image from each other by blurring a face image obtained by imaging by imaging unit 14 of mobile terminal 2 with the blurring amount obtained in advance. The reason for this is that the real image can be authenticated, but the photographic image cannot be authenticated. The obtained blurring amount is associated with the registered image and stored in the blurring amount DB.

It may be preferable to blur the face image by applying a Gaussian filter. Therefore, the blurring amount is the number of times the filter is applied. The method of blurring the face image is not limited to using the Gaussian filter, and any method may be used as long as a smoothing filter is used. Examples of the smoothing filter include a median filter and a bilateral filter. The blurring amount may be a filter parameter instead of the number of times the filter is applied. For example, in a case of the Gaussian filter, the blurring amount can be changed by changing a standard deviation $\sigma$ that is a parameter thereof.

Figure 5:
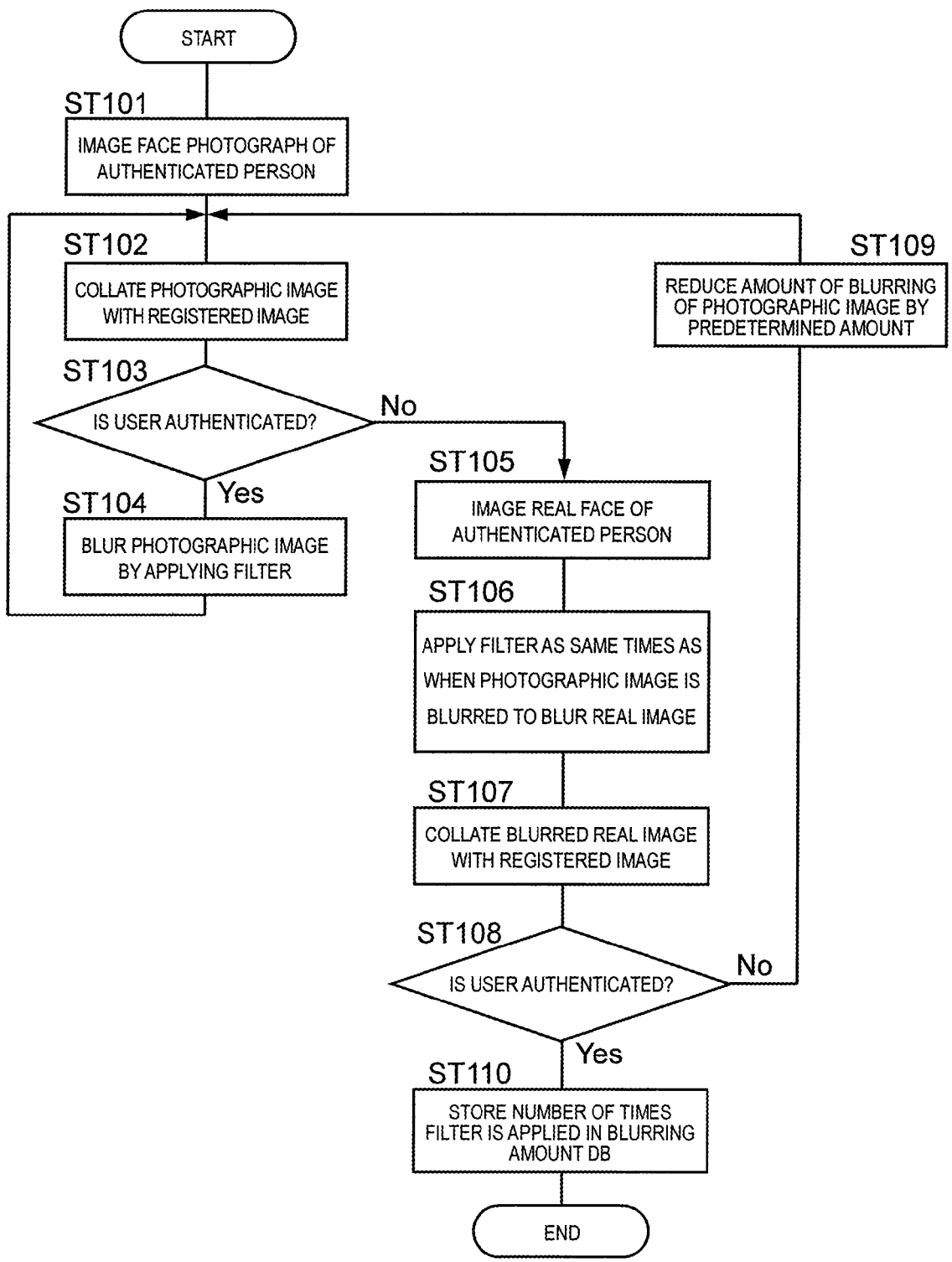
FIG. 5 is a flowchart for illustrating a method of obtaining a blurring amount.

Next, a method of obtaining the above-described blurring amount will be described with reference to the flowchart of FIG. 5. The following process may be performed by mobile terminal 2 or may be performed by another terminal device that can communicate with authentication server 3. When using other terminal devices, it is preferable to use an imaging device having the same imaging capability as that of imaging unit 14 of mobile terminal 2 so as to make the same imaging conditions as those during the real face authentication.

First, a face photograph of the authenticated person is imaged (step ST101). Subsequently, the photographic image obtained by imaging the face photograph is transmitted to authentication server 3, and authentication server 3 collates the photographic image with the registered image to perform face authentication (step ST102). Then, if the authentication result is received from authentication server 3 and the user is authenticated in the authentication result (step ST103: Yes), the process proceeds to step ST104, and if the user is not authenticated (step ST103: No), the process proceeds to step ST105.

In step ST104, the photographic image is blurred by applying the Gaussian filter with the standard deviation a. After step ST104, the process returns to the previous step ST102. In step ST102, the blurred photographic image is again collated with the registered image to perform face authentication. If the user is authenticated (step ST103: Yes), the process proceeds to step ST104, and if the user is not authenticated (step ST103: No), the process proceeds to step ST105. As described above, after step ST103, the process may proceed again to step ST104 to repeat the process of blurring the blurred photographic image again. So, the number of times the Gaussian filter is applied to the photographic image in step ST104 should be stored.

In step ST105, the real face of the authenticated person is imaged. Subsequently, the Gaussian filter is applied as same times as when the photographic image is blurred, so as to blur the real image (step ST106). As described above, the number of times the Gaussian filter is applied to the photographic image is stored.

Subsequently, the blurred real image is transmitted to authentication server 3, and authentication server 3 collates the photographic image with the registered image to perform face authentication (step ST107). Then, if the authentication result is received from authentication server 3 and the user is authenticated in the authentication result (step ST108: Yes), the process proceeds to step ST110, and if the user is not authenticated (step ST108: No), the process proceeds to step ST109.

In step ST109, the blurring amount of the photographic image is reduced by a predetermined amount. Specifically, the blurring amount obtained by applying the Gaussian filter once is defined as a blurring amount $\alpha$, and the blurring amount of the photographic image is reduced by a blurring amount $\beta$ ($0 \leq \beta \leq \alpha$) smaller than the blurring amount $\alpha$. This makes it possible to finely adjust the amount of photographic image blur. After step ST109, the process returns to step ST102.

As described above, after step ST108, the process may proceed again to step ST110 to repeat the process of reducing the blurring amount of the photographic image by the blurring amount β. For this reason, the total amount reduced in step ST109 is stored in advance. The total sum of the reduced amounts is a value obtained by multiplying the blurring amount β by the number of times step ST109 is performed.

In step ST110, the number of times the Gaussian filter is applied to the photographic image is stored as a blurring amount in the blurring amount DB in association with the registered image. In a case where step ST109 is performed, an amount obtained by subtracting the sum of the amounts (value obtained by multiplying the blurring amount β by the number of times step ST109 is performed) reduced in step ST109 from the blurring amount (value obtained by multiplying the blurring amount β obtained by applying the Gaussian filter once by the number of times step ST104 is performed) corresponding to the number of times the Gaussian filter is applied to the photographic image is stored in the blurring amount DB as a blurring amount.

In this way, it is possible to obtain a blurring amount that can be authenticated when the real image is blurred, but cannot be authenticated when the photographic image is blurred.

Figure 6A:
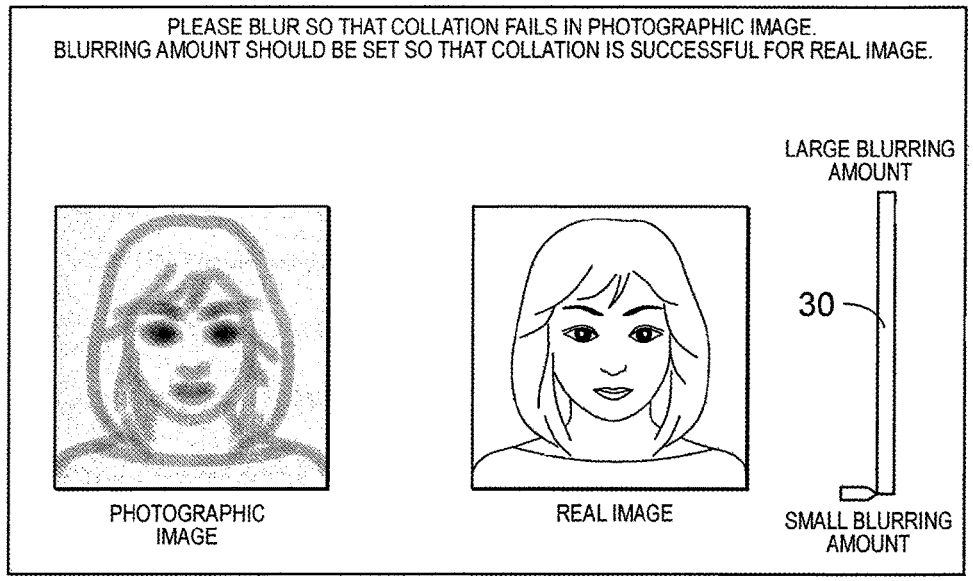
FIGS. 6(a) and 6(b) are diagrams illustrating a designation screen when a user manually designates the blurring amount.

In step ST104, the blurring amount when blurring a photographic image by applying the Gaussian filter may be manually designated by the user. In this case, as illustrated in FIG. 6(a), a designated screen is displayed on a display, and the user designates the blurring amount via the designated screen. On the designation screen, slider bar 30 for designating a photographic image, a real image, and a blurring amount is displayed. On the designated screen, for user friendliness, a sentence of "Please blur so that the collation fails in the photographic image. The blurring amount should be set so that the collation is successful for the real image" is displayed.

Figure 6B:
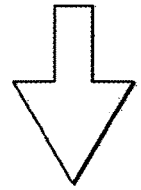
Figure 6B:
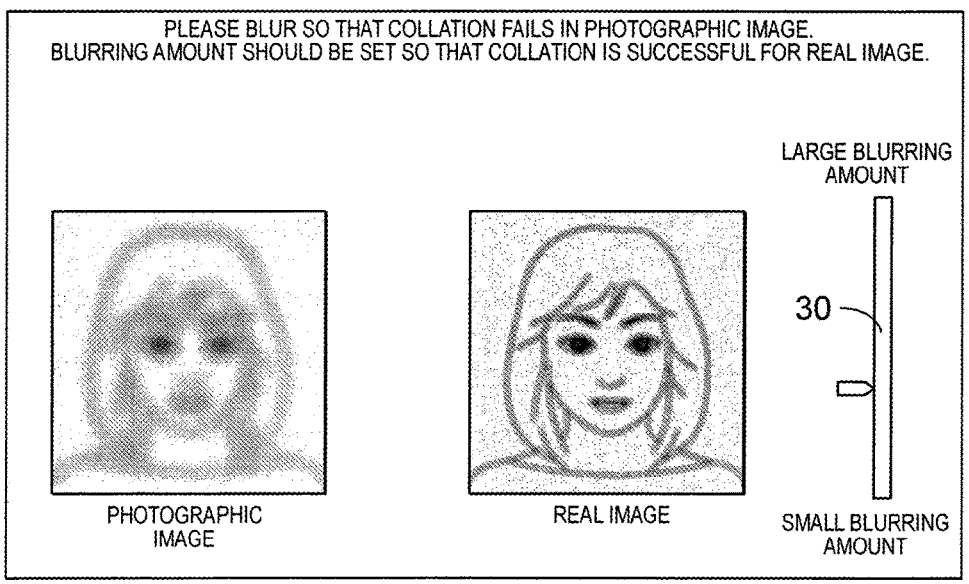

As illustrated in FIG. 6(b), when the user operates slider bar 30 on the designation screen and designates an arbitrary blurring amount, an image obtained by blurring the photographic image and the real image with the designated blurring amount is displayed. As a result, the user can visually recognize the blurred photographic image and real image, and can sensuously designate the blurring amount based on a visual recognition result. Thereafter, the user operates slider bar 30 to repeat the fine adjustment of the blurring amount to determine a desired blurring amount. After the desired blurring amount is determined, the process proceeds to step ST105 by performing a predetermined operation such as pressing a collation button (not shown). In this way, the blurring amount can be set intuitively by the user.

Figure 7:
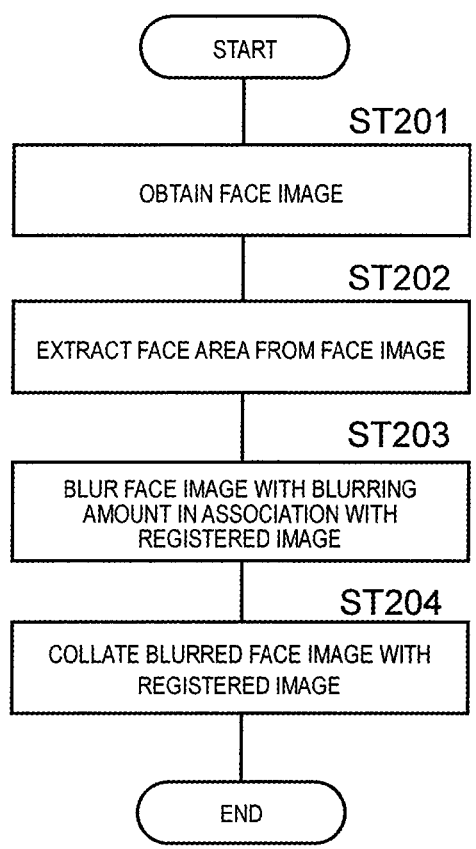
FIG. 7 is a flowchart for illustrating a series of processes in a collation device according to the present disclosure.

Next, a series of processes in collation device (mobile terminal) 2 according to the present disclosure will be described with reference to the flowchart of FIG. 7.

First, a real face or a face photograph of the authenticated person is imaged by imaging unit 14 of mobile terminal 2 to obtain a face image (captured image) of the authenticated person (step ST201). Subsequently, a face area is extracted from the acquired face image (step ST202). This may be performed using a known face area extraction method in the related art based on feature points such as each part of the face (for example, eyes, nose, and mouth) and contour.

Next, the face image is blurred with the blurring amount in association with the registered image corresponding to the face image (step ST203). As described above, the blurring amount is stored in the blurring amount DB stored in storage unit 13 of mobile terminal 2 in association with the registered image. Identification of the registered image corresponding to the face image may be performed by transmitting the face image (captured image) of the authenticated person to authentication server 3 and collating the face image with registered image data stored in authentication server 3. The identification of the registered image corresponding to the face image may be performed by using ID, a password, or the like which are registered in advance.

Subsequently, the face image blurred with the blurring amount is transmitted to authentication server 3, and authentication server 3 collates the face image with the registered image to perform face authentication (step ST204). As described above, since the blurring amount is set such that the real image can be authenticated but the photographic image cannot be authenticated, if the face image (captured image) is a photographic image, authentication cannot be acquired.

As described above, according to collation device (mobile terminal) 2 of the present disclosure, when performing the face authentication, the real image and the photographic image can be distinguished from each other by blurring the face image (captured image) obtained by imaging with imaging unit 14 with a previously obtained blurring amount (a blurring amount for collation). This makes it possible to simply and easily prevent impersonation using a face photograph.

As described above, although the present disclosure was described based on specific embodiments, these embodiments are merely examples, and the present disclosure is not limited by these embodiments. All of the components of the collation device and the collation method according to the present disclosure described in the above embodiments are not necessarily essential, and can be appropriately selected as long as it does not depart from the scope of the present disclosure.

For example, in the present embodiment, collation system 1 is configured to include mobile terminal 2 and authentication server 3, but the function of authentication server 3 may be incorporated in mobile terminal 2. In this case, collation system 1 is configured to only include mobile terminal 2.

In the present embodiment, face authentication in mobile terminal 2 has been described; however, collation system 1 according to the present disclosure can be applied to various uses such as face authentication in a non-mobile terminal such as a desktop personal computer, and face authentication in a security system that unlocks an electric key or an automatic door at an entrance and exit gate.

In the present embodiment, imaging unit 14 has been described as an example in which the focal distance is fixed, but is not limited thereto. Imaging unit 14 having a variable focal distance may be used. Here, in a case where the focal distance is variable, the captured image cannot be blurred with the blurring amount for collation at the time of collation. Therefore, in a case of using imaging unit 14 with a variable focal distance, it is desirable to perform control so that the subject is imaged using the same focal distance as that used when setting the blurring amount for collation.

In this embodiment, the configuration in which the authentication is performed by collating the face image has been described as an example, but the present disclosure is not limited to this. The authentication is merely one application of collation technology. For example, it is possible to consider to perform the collation that does not assume authentication, such as a case of searching for a person with a specific feature, and the present embodiment can also be applied to such a case. Further, the target of collation is not limited to a person's face. The subject may be another subject that can perform a fraud act of being confused with an actual subject by using a photograph of the subject. For example, the present embodiment can be also applied to a case where a brand product or a noble metal is identified remotely.

INDUSTRIAL APPLICABILITY

A collation device and a collation method according to the present disclosure is useful as a collation device and a collation method that can easily prevent fraud using a photograph in a collation technique for collating a captured image obtained by imaging a subject with an imaging device with a registered image of a registered subject registered in advance.

REFERENCE MARKS IN THE DRAWINGS

1 COLLATION SYSTEM
2 MOBILE TERMINAL (COLLATION DEVICE)
3 AUTHENTICATION SERVER
4 NETWORK
11 PROCESSOR
12 MEMORY
13 STORAGE UNIT
14 IMAGING UNIT
15 OPERATING UNIT
16 DISPLAY UNIT
17 COMMUNICATION UNIT

The invention claimed is:

1. A collation device that collates a captured image obtained by imaging a subject by using an imaging device with a registered image of a registered subject which is registered in advance, the collation device comprising:
 a processor; and
 a memory that stores a blurring amount which is set in advance for collation in association with the registered image in advance,
 wherein the processor blurs the captured image with the blurring amount for collation associated with the registered image corresponding to the captured image, and collates whether or not the subject in an image blurred with the blurring amount for collation matches the registered subject in the registered image by using the image, and
 wherein the blurring amount for collation is set such that, a real image blurred by the blurring amount is capable of being collated but a photographic image blurred by the blurring amount is not capable of being collated, the real image being an image obtained by imaging a real subject and the photographic image being an image obtained by imaging a photograph of the subject.

2. The collation device of claim 1,
 wherein the blurring amount for collation is obtained by repeating the collation after blurring the real image and the photographic image with a predetermined blurring amount.

3. The collation device of claim 1,
 wherein the blurring amount for collation is obtained by repeating the collation after blurring the real image and the photographic image with a blurring amount designated by a user.

4. The collation device of claim 1,
 wherein the captured image is blurred by applying a smoothing filter, and the blurring amount for collation is set as the number of times the smoothing filter is applied or as a parameter of the smoothing filter.

5. The collation device of claim 1,
 wherein the processor controls the imaging device so that imaging of the subject when performing the collation is performed using a focal distance used when the blurring amount for collation is set.

6. The collation device of claim 1,
 wherein the subject is a person's face.

7. A collation method of collating a captured image obtained by imaging a subject by using an imaging device with a registered image of a registered subject which is registered in advance, the method comprising:
 storing, in a memory, a blurring amount which is set in advance for collation in association with the registered image in advance;
 blurring, by a processor, the captured image with the blurring amount for collation associated with the registered image corresponding to the captured image; and
 collating, by the processor, whether or not the subject in an image blurred with the blurring amount for collation matches the registered subject in the registered image by using the image,
 wherein the blurring amount for collation is set such that, a real image blurred by the blurring amount is capable of being collated but a photographic image blurred by the blurring amount is not capable of being collated, the real image being an image obtained by imaging a real subject and the photographic image being an image obtained by imaging a photograph of the subject.

* * * * *